(No Model.) 2 Sheets—Sheet 1.

R. D. CRISWELL.
FIFTH WHEEL FOR VEHICLES.

No. 394,912. Patented Dec. 18, 1888.

Witnesses:
R. H. Orwig,
M. P. Smith

Inventor:
Robert D. Criswell,
By Thomas G. Orwig, Atty.

(No Model.) 2 Sheets—Sheet 2.

R. D. CRISWELL.
FIFTH WHEEL FOR VEHICLES.

No. 394,912. Patented Dec. 18, 1888.

Witnesses:
R. H. Orwig,
M. P. Smith.

Inventor:
Robert D. Criswell,
By Thomas G. Orwig,
Attorney.

UNITED STATES PATENT OFFICE.

ROBERT D. CRISWELL, OF WINTERSET, IOWA, ASSIGNOR OF TWO-THIRDS TO ISAAC WELKER AND ABNER B. HEATON, OF SAME PLACE.

FIFTH-WHEEL FOR VEHICLES.

SPECIFICATION forming part of Letters Patent No. 394,912, dated December 18, 1888.

Application filed July 2, 1888. Serial No. 278,870. (No model.)

*To all whom it may concern:*

Be it known that I, ROBERT D. CRISWELL, a citizen of the United States of America, and a resident of Winterset, in the county of Madison and State of Iowa, have invented an Improved Fifth-Wheel and Reach-Coupling for Vehicles, of which the following is a specification.

My object is to improve the operation, strength, and durability of the running-gear of a vehicle without increasing the cost; and my invention consists in the construction and combination of two disks and a coupling device with an axle, a spring, and a reach, as hereinafter set forth, pointed out in my claims, and illustrated in the accompanying drawings, in which—

Figure 1:
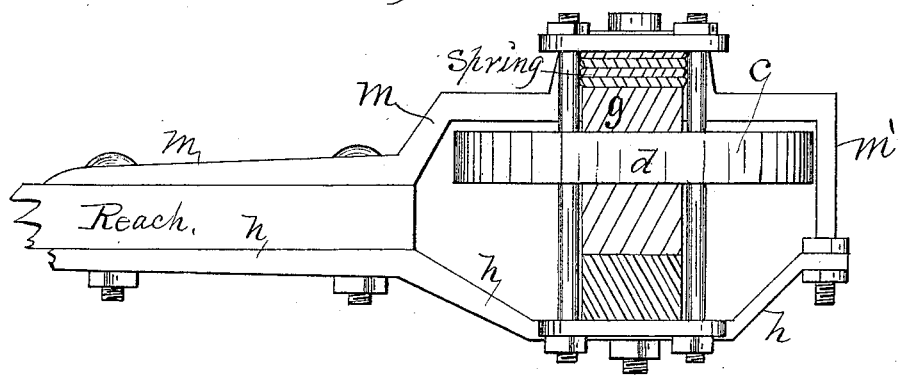
Figure 2:
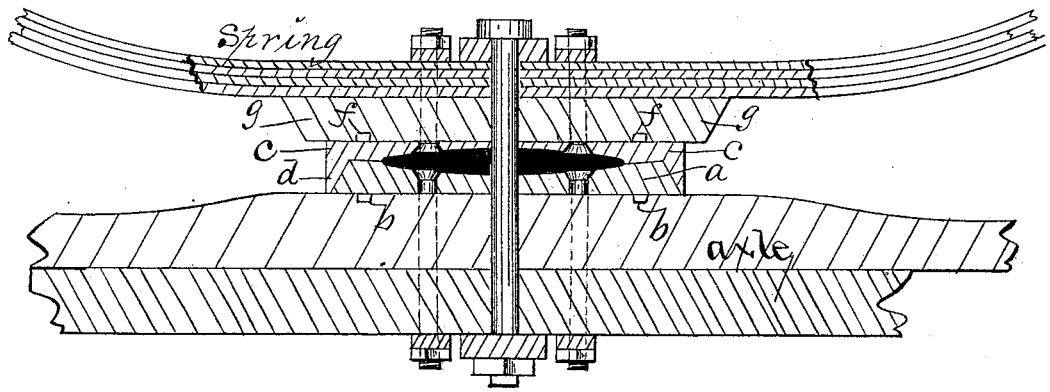
Figure 3:
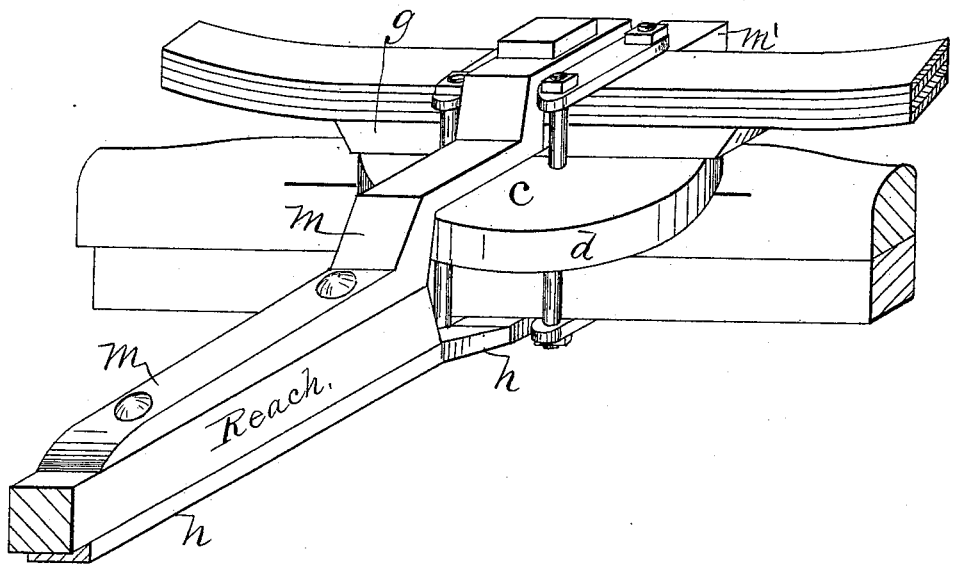

Figure 1 is a side view of the disks and coupling device combined with an axle and springs. Fig. 2 is a transverse sectional view through a line immediately in rear of the axle and spring. Fig. 3 is a perspective view.

$a$ is a circular metal plate or disk. It has an annular raised surface at its circumference and top surface and a beveled periphery. The depressed center of the top surface is adapted to retain a lubricant. Projections $b$ on its under side are designed to enter corresponding cavities in the upper surface of an axle to prevent any motion relative to the axle.

$c$ is a mating disk that has an annular flange, $d$, at its circumference and under side adapted to overlap the periphery of the disk to prevent any lateral motion relative to the plate and to exclude dirt from entering between the two disks.

$f$ are projections on the top surface, that enter corresponding cavities in the under surface of a block, $g$, that is fixed to a spring, and prevent any motion of the disk relative to the spring.

Perforations through the centers of the overlapping disks $a$ and $c$, the axle-block, and the spring allow a bolt to be passed through vertically to connect the disks and the axle and spring in such a manner that the axle and disk $a$ will rotate jointly, and the disk $c$ and the spring will also rotate jointly, as required in turning the direction of a vehicle.

$h$ is the under part of a reach-coupling, and $m$ the upper part, that jointly encircles the axle and spring and the disks $a$ and $b$, and that is pivoted to them jointly by means of a bolt, $n$, that is extended vertically through coinciding perforations in all the parts. A right-angled extension, $m'$, at the front end of the upper part, $m$, of the reach is screw-threaded at its bottom and secured to the lower part, $h$, by means of a nut or in any other suitable way, as required to rigidly connect the front ends of the two separable parts of the coupling, that are adapted in shape at their rear ends to be rigidly connected with a reach. An axle, a spring, (or bolster,) and a reach can be thus detachably connected by means of a bolt in such a manner that the spring and axle will have independent motion, as required in turning the direction of a vehicle, and also in such a manner that there will be no lateral motion of the separate parts, and consequently less friction and strain and wear in the complete device.

I claim as my invention—

1. An improved fifth-wheel for vehicles, consisting of a metal disk having an annular raised surface at its circumference, a central perforation, and projections on its under side, and a mating and overlapping disk having an annular flange at its circumference and under side and projections on its top surface, in combination with an axle and a spring or bolster, for the purposes stated.

2. The plate $a$, having projections $b$, the plate $c$, having a flange, $d$, and projections $f$, in combination with a spring, a fixed block, $g$, an axle, and the mating parts of the coupling $h$ and $m$, substantially as shown and described, for the purposes stated.

ROBERT D. CRISWELL.

Witnesses:
M. P. SMITH,
THOMAS G. ORWIG.